LOCAL FIRST SELECTOR CIRCUIT

Filed April 22, 1954

FIG. I

INVENTOR.
WILLIAM W. PHARIS
BY Warren Whitesel
ATTORNEY

United States Patent Office 2,868,885

Patented Jan. 13, 1959

2,868,885

LOCAL FIRST SELECTOR CIRCUIT

William W. Pharis, Rochester, N. Y., assignor, by mesne assignments, to General Dynamics Corporation, a corporation of Delaware Application April 22, 1954, Serial No. 424,846

12 Claims. (Cl. 179—18)

This invention relates to electro-mechanical telephone systems and more particularly to a local first selector which is adapted for use in such a system.

For a long period of time, telephone systems have been adapted to use an office name and a plurality of digits to identify a subscriber line. In dial systems, it was conventional to dial the first two letters in the office name followed by, for example, four subscriber line identification digits—or stated otherwise, a six digit code. In large metropolitan telephone exchanges this scheme was superseded by a seven digit code; however it was not until recently that smaller type exchanges have been forced to the seven digit codes as a result of growth and the preparation for intertoll dialing. Therefore, the trend in most of the smaller offices is to seven digit codes wherein the first three are office selecting digits and the last four are line selecting digits. Conventionally, the first two office selecting digits are the first two letters of the office name and the third office selecting digit is a numerical designation. This numbering system requires local first selectors which are able to absorb selectively various ones of the office selecting digits as required by new trunking schemes. It is desirable to make these digit absorbing selectors as flexible as possible so that they may be used in various offices, each of which may have a different trunking and hence numbering scheme.

One object of this invention is to provide a new and improved local first selector.

A second object of this invention is to provide a selector switch which is adapted to absorb particular digits among the office selecting indicia.

Another object of this invention is to provide a local first selector switch which is adapted for use in a telephone system wherein the first and third digits may be the same.

A further object of this invention is to provide a selector switch which may be used in a telephone system wherein the second and third digits may be the same.

Yet another object of this invention is to provide a local first selector switch having flexibility of operation such that it may be used in a seven digit telephone system wherein either the first and third or the second and third digits are identical.

Means for accomplishing these objects is illustrated by a system using a flat-type, step-by-step selector switch of the type sold under the trademark "XY"; although, it should be understood that other types of switches could be used without departing from the scope of my invention. This switch is usually provided with a first set of wipers that carry two voice and two control conductors. These wipers are normally moved, first in a primary direction and next in a secondary direction so that the switch may select between any of a number of possible positions. The switch also has an auxiliary set of wipers that are moved simultaneously with the first set of wipers during the primary motion of the switch under the influence of subscriber transmitted digit pulses. The auxiliary wipers make contact with a set of terminals that are marked selectively in accordance with the distance that the switch moves in its primary direction. These markings may be connected through the auxiliary wipers to the selector circuit where various operations may be controlled to change the mode of switching depending upon the digits dialed to control the switch motion in its primary direction.

Various optional wirings are provided which may be connected with the auxiliary bank contacts to cause the switch to drop-back to normal depending upon the distance that the switch travels in the primary direction. Means is provided in the form of a plurality of counting relays so that the selector circuit may register the number and types of digit absorptions as they occur. When a sufficient number of preceding operations have been completed, the selector may utilize the next digit pulse train to seize the next rank of selecting equipment.

This provides a flexibility of operation such that a number of digit pulse trains may be used or absorbed as required.

These and other objects will be obvious to those skilled in the art from the following description of the circuit in operation.

Figure 2:
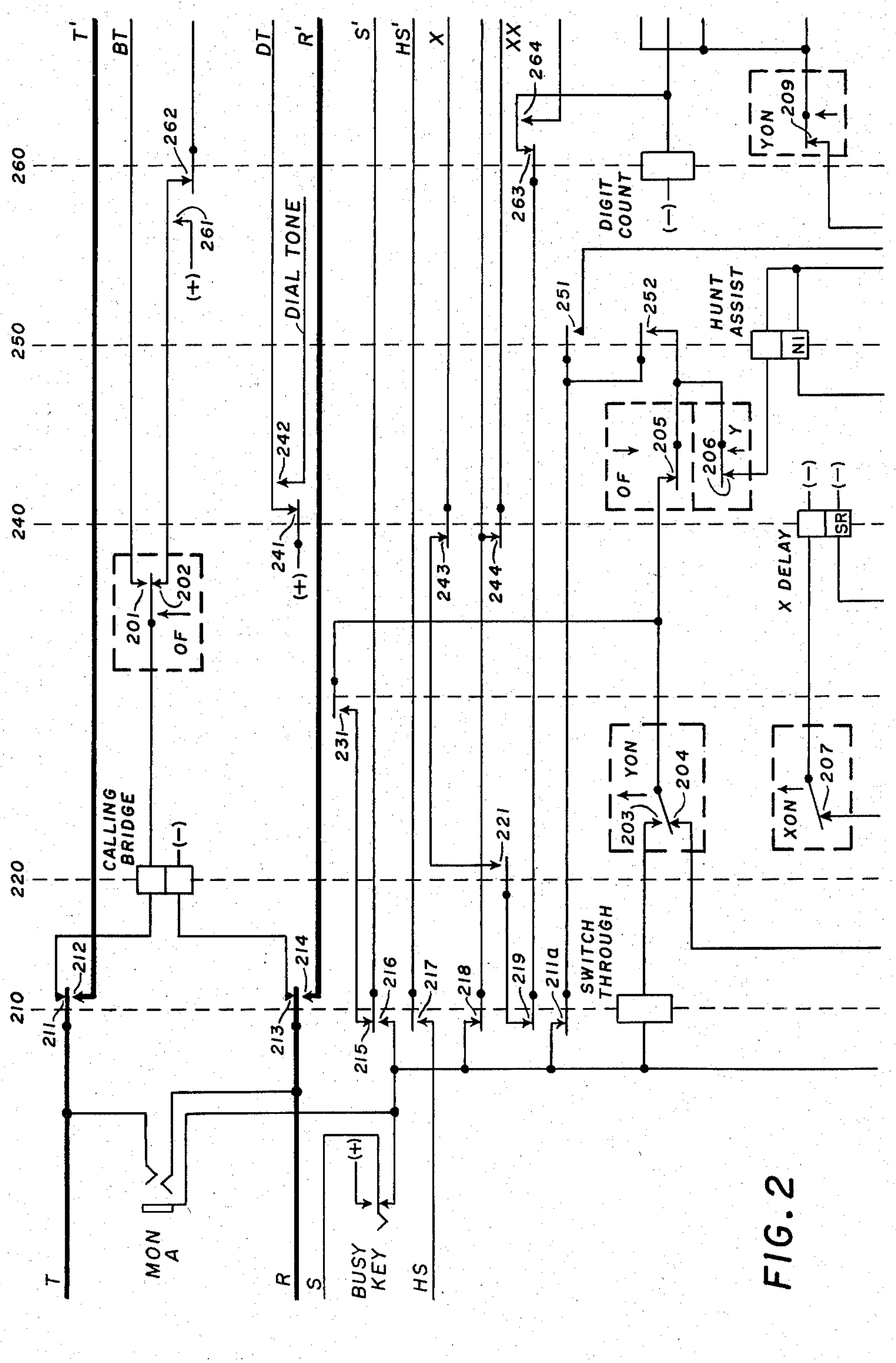
Figs. 2, 3 and 4 show in detail the local first selectors shown in Fig. 1.
Figures 3, 5:
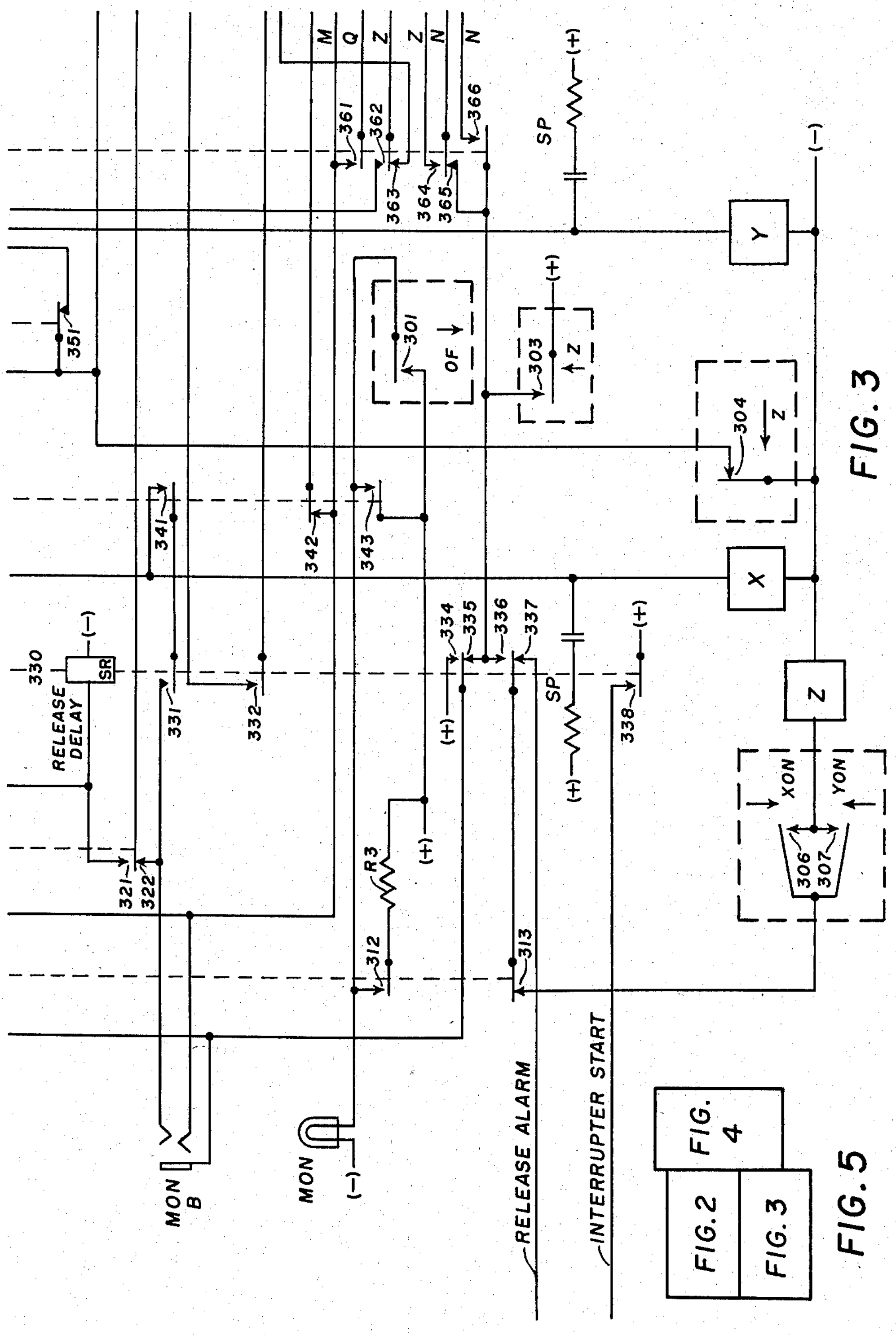
Fig. 5 shows the manner in which Figs. 2–4 should be arranged to provide a clear and understandable circuit arrangement.
Figure 4:
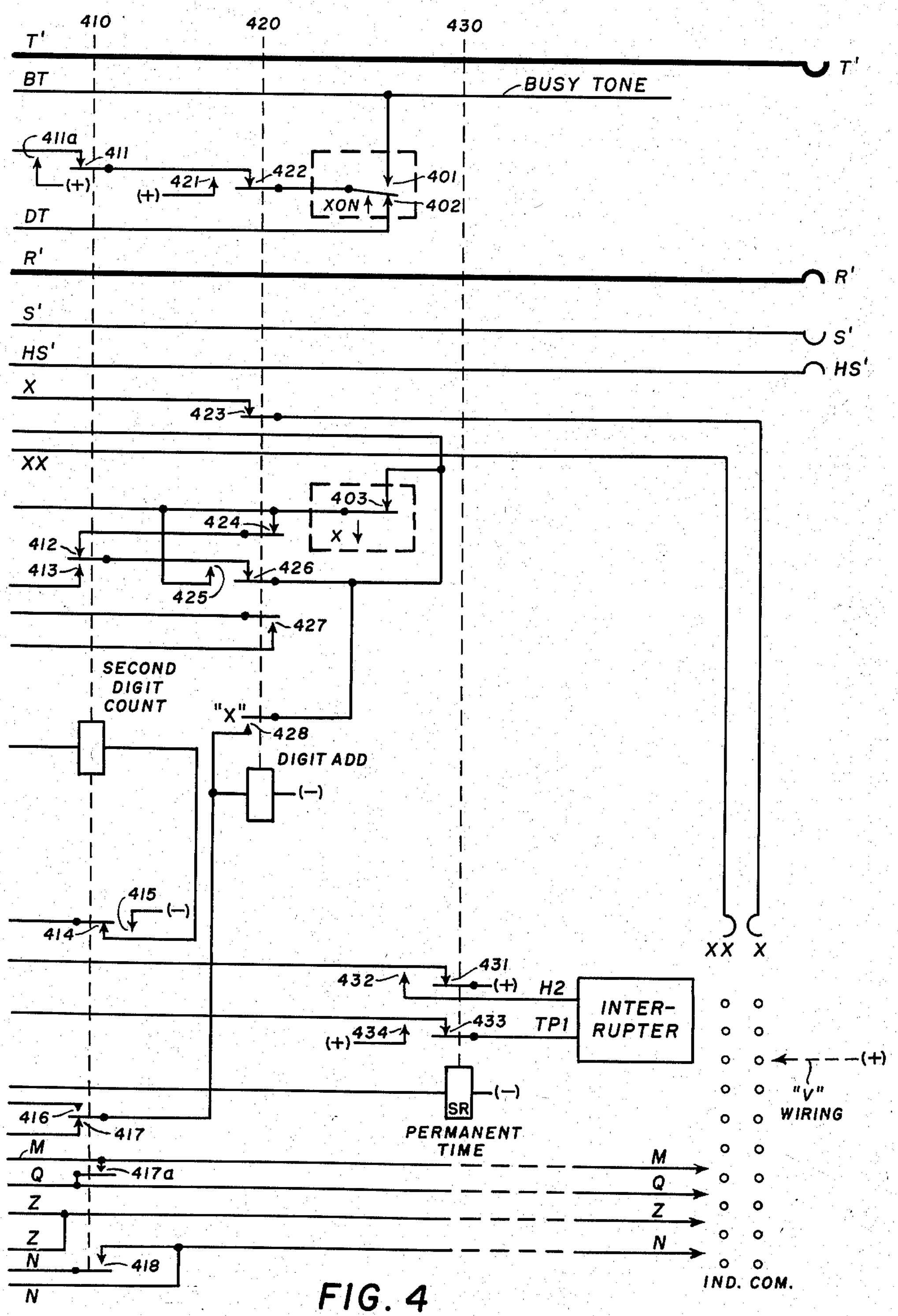

In preparing these drawings, care has been used to show circuit details as clearly and concisely as possible. For example, the power source is identified by a simple (+) and (−) sign. As is conventional in most telephone systems, the positive (+) terminal is identified as being connected with ground. It should be understood that this or any similar arrangement could be used. Figs. 2–4 show various disconnected elements enclosed in dotted rectangles such as overflow contacts OF which are operated by the switch at the extremity of its motion either in the primary or secondary direction. Various interrupter springs are shown. These springs complete or break electrical circuits under the influence of the driving or release magnets of the switch. Both the magnets and interrupter springs are identified by the letters "X, Y or Z." Off-normal springs are arranged to be operated by the switch when it takes its first step in either direction. The primary motion off-normal springs are identified by the letters XON while the secondary motion off-normal springs are identified by the letters YON. Various elements such as line circuit 100, line finder 101, elements 103—110, line circuit 120, line finder 121 and elements 123—127 are all conventional equipment which may be used in any well-known manner; therefore, these elements are shown only by a block diagram. It should be understood that those skilled in the art, may select freely any one of many elements which are suitable for use in connection with this circuit.

A plurality of level marking wirings (M, Q, Z, N and V) are provided to be connected to any desired level in the auxiliary bank of terminals or contacts X and XX. The switch may be driven to select any of these levels in its primary motion. Responsive thereto, the switch operates differently depending on how the marking wirings are connected.

*General description*

Figure 1:
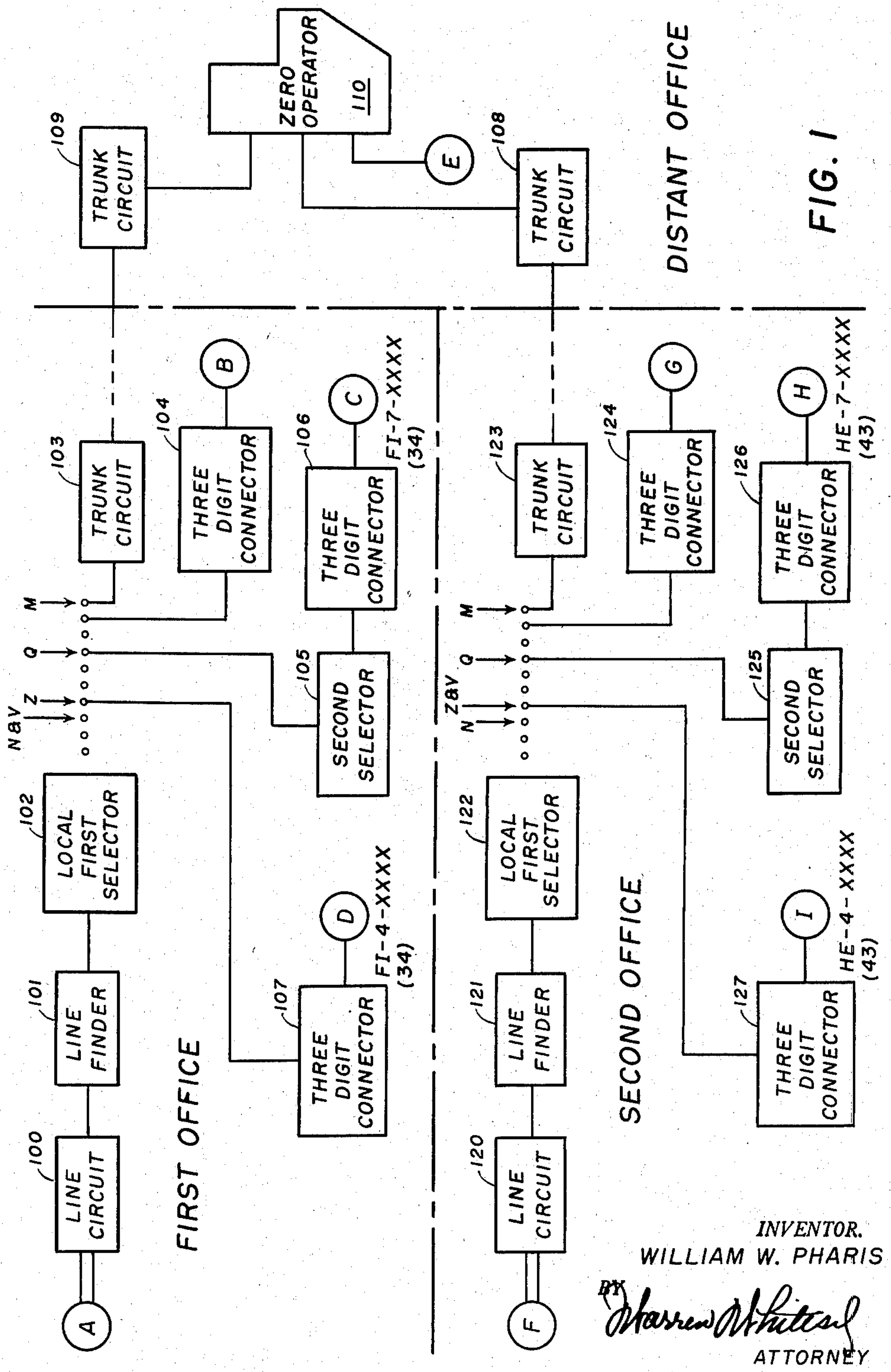
Fig. 1 shows broadly a telephone system utilizing different trunking arrangements.

Fig. 1 shows two subscribers A and F, who for the purpose of description will be considered as calling subscribers, and seven other subscribers labeled B, C, D, E, G, H and I who have been shown as called subscribers to illustrate the various optional arrangements under which the selector may operate. It should be understood that these arrangements are for purposes of explanation only and that other trunking diagrams could be prepared by using different combinations of the various options as required.

These calls are completed in different ways depending upon the particular combination of optional wirings that are used. For example, brushes T′, R′, S′ and HS′ are arranged to be moved in both a primary and a secondary motion. Auxiliary brushes X and XX move over their associated bank of contacts simultaneously with this primary motion. Means, in the form of optional wirings, are provided to cause desired switch operations depending upon the specific level to which the switch is directed during the primary motion. Wiring M is one marking means which always causes the switch to operate in its secondary direction without regard to the position of a digit pulse train in a given series of pulse trains. A second marking means, wiring V, is adapted to cause a first digit marking relay, 260, to operate and thereby register a first switch operation. A third marking means, wiring N, causes the switch to return to normal any time that it is encountered except after the switch has been unlocked. Wiring Z is a fourth marking means which causes the switch to drop-back and operates a second digit marking relay, 410, the first time that wiring Z is encountered during a particular call in which wiring V has been encountered previously; or, if wiring Z is encountered a second time in the particular call, the switch drops-back and a third digit marking relay, 420, is operated to unlock the switch so that it may be used thereafter on any level. A fifth marking means, wiring Q, is effective to cause the switch to operate in its secondary direction if it is encountered after either of the relays 260 or 410 has operated.

If either of the subscribers A or F wishes to call subscriber E, it is only necessary to dial one digit which may call the operator identified in the last finger hole of a conventional telephone dial. Since this hole also contains the numeral 0, the operator is called a zero operator. On this call, either of the local first selector switches 102 or 122 is arranged to complete the connection on the first digit dialed; therefore, an M wiring is connected to the tenth or zero level.

If local subscriber A wishes to call another local subscriber D, only four digits are necessary one of which sets first local selector 102 and the remainder of which set a three digit connector 107. It is highly desirable to have the same subscriber line seized by the same calling number in each case since this avoids dialing errors resulting from subscriber mistakes. Therefore, if a full complement of seven digits are to be used, it is necessary for local first selector 102 to absorb the first three office selecting digits. When the switch is directed by the first digit to a level marked by the N and V wiring, the switch drops back and a train of counting relays 260, 410 and 420 registers the fact that one digit has been absorbed. The second digit directs the switch to a level marked by the Z wiring which also causes the switch to drop back and the counting relays record the fact that the second digit has been absorbed. The third digit directs the switch once more to select the level having the Z wiring and the counting relays record the absorption of the third digit as the switch drops-back. The switch is unlocked this time so that the next digit is effective regardless of which level may be dialed.

On calls from subscriber A to subscriber C, the N and V wiring marks the position to which switch 102 is directed first. The Z wiring marks the position to which the switch is next directed. The third operation causes selector 102 to seize second selector 105 on a level marked by Q wiring. The following and fourth digit operates selector 105 while the fifth, sixth and seventh digits control connector 106 which is operated in a conventional manner. In this example, selector 102 is not unlocked so that only certain particular levels may be switched through.

On calls from subscriber A to subscriber B the first digit propels the switch to the N and V marked level. From this point the switch drops-back. The second digit propels the switch to the level marked by the Z wiring from which the switch drops-back again. On the third digit the switch is driven to the Z wiring again. Once more it drops-back and is unlocked so that it may cut through on the fourth digit pulse train.

In a similar manner, subscriber F in the second office, may call either subscriber I or subscriber G. It is necessary to absorb three digits; therefore, the switch is successively directed to the levels marked, first by the Z and V wiring, second to the level marked by the N wiring and third to the level marked by the Z and V wiring. In each case, selector 122 drops-back and counting relays 260, 410 and 420 registers the number of digit pulse trains that are received and absorbed. On the fourth digit pulse train, any level may be selected without regard to the wiring that may be on the X and XX bank because the switch is then unlocked.

Subscriber H may be seized by dialing first, the level marked by the Z and V wiring from which the switch drops-back and counting relays register the first digit absorbed. Second, the switch reaches a level marked by the N wiring from which the switch also drops-back and again records the number of digits that are absorbed. On the third digit the Q wired level is dialed and the switch does not drop-back but switches through so that the next digit pulse train is effective for setting second selector 125 and the last three digits cause connector 126 to seize and signal subscriber H.

*Detailed description*

It is thought that these calls may be best understood by referring to a detailed description of the circuit elements in local selectors 102 or 122—they are both the same.

*Call to distant office*

The first call to be described is from either subscriber A or subscriber F to subscriber E who is in a distant office. In either case the calling subscriber dials zero to seize operator position 110 in the distant office. She then completes the call to subscriber E in any suitable manner as by a manually connected plug and jack or by suitable electro-mechanical switching apparatus.

More specifically, the calling subscriber removes his hand set and a line circuit, such as 100 or 120 functions to cause a line finder to seize the calling line after which a local first selector is operated to the zero level, marked by an M wiring, and the talking conductors are cut through to complete the connection. The local selector 102 or 122, is shown in detail in Figs. 2, 3 and 4 when arranged as shown in Fig. 5.

*Seizure*.—Responsive to the receipt of a call, calling bridge relay 220 is operated over a circuit which may be traced from ground (+) on contacts 241 of X delay relay 240, resting X off-normal contacts 402, resting contacts 422 of digit add relay 420, resting contacts 411 on second digit count relay 410, resting contacts 262 of digit count relay, overflow springs 202 and the upper winding of calling bridge relay 220 to the calling subscriber's station by way of contacts 211 and tip conductor T. From the subscriber station, the loop is completed over ring conductor R and contacts 213 to (−) battery through the lower winding of calling bridge relay 220. At contacts 221, calling bridge relay 220 prepared a circuit for connecting the X brush to control digit count relay 260 at a later time. Another circuit is made at contacts 321 by calling bridge relay 220 for completing a circuit from (−) battery through the winding of release-delay relay 330, operated contacts 321, to rest contacts 431 and ground (+) on permanent time relay 430.

Release delay relay 330 operates to hold the circuit during pulsing. At its lowermost contacts 338, it completes a circuit to the interrupter start conductor for providing various timed supervisory pulses. At its next set of contacts 337, a circuit to release magnet Z is opened so that the switch will not drop-back to normal when X off-normal contacts 306 close. Master ground (+) at contact 334 is connected to sleeve conductor S for holding preceding equipment and for marking the selector busy. A circuit is completed at contacts 332 to permanent time relay 430. If the selector operation is not completed before the expiration of a predetermined time interval, the selector is returned to normal as described below in the section entitled "Permanent time." At contacts 331 release delay relay 330 prepares a holding circuit for X delay relay 240. At contacts 231, release delay relay 330 completes a circuit to the outgoing sleeve conductor S' by way of contacts 215 on switch through relay 210.

When calling bridge relay 220 operates and closes its contacts, a circuit is completed for operating X delay relay 240 in parallel with release delay relay 330, the circuit being traced from (—) battery through the upper winding of X delay relay 240, X off-normal contacts 207, and operated contacts 321 to ground (+) on rest contacts 431 on permanent time relay 430. X delay relay 240 operates and a circuit is completed at its contacts 343 for causing monitor lamp MON to glow brightly as an indication that the selector has been seized but has not operated as yet. At contacts 342, the X delay relay opens a circuit from the M conductor to prevent an inadvertent operation responsive to the XX brush passing over but not stopping on an M wired level during its primary switch motion. The X delay relay also closes contacts 341 by means of which it is prepared to hold during pulsing from ground (+) applied under the influence of permanent time relay 430. This holding circuit may be traced through contacts 431, 322 (now open), 331 and 341 and the winding of relay 240 to (—) battery. The XX conductor is opened at operated contacts 244 on the X delay relay and the X conductor is opened at operated contacts 243. Dial tone is applied at contacts 242. The dial tone circuit may be traced over contacts 242, X off-normal break contacts 402, rest contacts 422, 411, 262 and 202 through the upper winding of calling bridge relay 220 to tip conductor T by way of rest contacts 211 on the switch through relay.

*Dialing.*—The calling subscriber hears dial tone and proceeds to dial or otherwise suitably transmit the first digit. The digit pulses are in the form of open circuit pulses or breaks in the loop completed from the upper winding of calling bridge relay 220 over tip conductor T, the calling subscriber station, ring conductor R and back through the lower winding of calling bridge relay 220. Responsive to each open loop pulse, calling bridge relay 220 releases to close its lowermost contacts 322 and thereby step the switch one step per pulse in its primary direction. The circuit to release delay relay 330 is opened during the break portion of each loop pulse; however, this relay does not restore due to its slow release characteristics. The original operating path for X delay relay 240 is opened by X off-normal contacts 207 which are broken when the switch takes its first step in the primary direction. However, this relay is also held throughout pulsing due to its slow release characteristics, the holding circuit being by way of X delay locking contacts 341, release delay relay contacts 331 and pulsing contacts 322 on the calling bridge relay to ground (+) applied through rest contacts 431 of permanent time relay 430.

The pulsing and stepping circuit for the X magnet is completed in parallel with the lowermost winding of X delay relay 240. This circuit may be traced from (—) battery through the winding of the X magnet and operated contacts 341 on the X delay relay operated contacts 331 on the release delay relay and pulsing contacts 322 on the calling bridge relay to ground (+) applied through contacts 431 of the permanent time relay. The switch is operated one step in its primary direction upon receipt of each digit pulse.

Following receipt of the last digit pulse and after a brief interval determined by its slow release characteristics, X delay relay 240 releases. The monitor lamp MON is extinguished when X delay relay 240 opens its contacts 343. This lamp should not remain in a brightly lit condition for very long. If it does it is an indication either that the switch is improperly held operated or that the switch is in overflow at the extremity of primary motion.

The X brush and conductor are connected through resting contacts 423 on digit add relay 420, 243 on the X delay relay, operated contacts 221 on calling bridge relay 220 and rest contacts 219 on switch through relay 210 to digit count relay 260 and (—) battery via contacts 263. Since there is no V wiring on this level nothing happens to digit count relay 260. The XX brush is connected through rest contacts 244 on the X delay relay and contacts 218 on the switch through relay to master ground (+) applied at contacts 334 of release delay relay 330.

Since the zero operator was dialed, the switch was directed to its tenth level which is marked by an M wiring connected to the XX bank. This wiring causes the switch to complete the connection responsive to the first series of digit pulses to be received.

*M wiring.*—Responsive to release of X delay relay 240 a circuit is completed to apply a ground (+) marking to the M conductor by way of the XX brush. This circuit may be traced from the M wiring through rest contacts 342 on X delay relay 240 and contacts 417 to (—) battery through the winding of digit add relay 420. This opens the X conductor which has no effect at this time.

The M wiring may also be traced through Y off-normal contacts 204, overflow contacts 205 and Y interrupter contacts 206, the upper winding of hunt assist relay 250, and the lower rest contacts 351 on hunt assist relay 250 to (—) battery by way of Z interrupter contacts 304. Hunt assist relay 250 closes its upper contacts, thereby providing a connection for operating the magnet Y to step the switch in its secondary direction. This circuit may be traced from (—) battery through the winding of magnet Y, operated contacts 251 on the hunt assist relay, rest contacts **211*a* on the switch through relay to master ground (+) applied by operated contacts 334 on release delay relay 330. When magnet Y operates to propel the switch it also opens Y interrupter contacts to restore hunt assist relay 250** which in turn opens the circuit to magnet Y which releases. From this point the operation of the switch depends upon whether the switch brushes are resting upon an idle or a busy trunk.

*Busy test.*—Assuming that the first step in the secondary direction has caused the switch to reach a busy trunk, a ground marking is extended over sleeve conductor S' through rest contacts 215 on switch through relay 210, operated contacts 231 on release delay relay 330, overflow springs 205 and Y interrupter springs 206, the upper winding of hunt assist relay 250 and its lowermost contacts 351 to (—) battery by way of Z interrupter springs 304. Switch through relay 210 does not operate since ground is applied to both sides of its winding—one from sleeve S' and the other from master ground on contacts 334. Hunt assist relay 250 operates responsive to ground on sleeve conductor S' and closes its upper contacts 251 to operate the Y magnet which in turn opens its interrupter contacts 206 to release hunt assist relay 250 which in its turn releases magnet Y by opening contacts 251. This cycle of operation is repeated on each trunk marked busy by means of a ground connection applied to conductor S'. It should be noted that the original operating path for hunt assist relay 250 is now open at operated Y off-normal contacts 204.

Means is provided to prevent the release at the hunt assist relay when the wipers are stepped off the S' bank contact marked by ground. That is, from the time that the hunt assist relay operates until it is released by opened Y interrupter contacts 206, which signifies the end of a completed step, a guarding ground marking is forwarded to conductor S'. This circuit may be traced from master ground (+) supplied through operated contacts 334 on release delay relay 330, rest contacts 211*a* on switch through relay 210, operated contacts 252 on hunt assist relay 250, normal overflow springs 205, operated contacts 231 on release delay relay 330 and rest contacts 215 on switch through relay 210 to sleeve conductor S'. A parallel circuit from the ground (+) including contacts 334, 211*a*, 252, 206, the upper winding of relay 250, contacts 351 and 304 to (−) battery may be traced to hold hunt assist relay 250 operated while brush S' is moving from one sleeve terminal to the next. Y-interrupter contacts 206 are arranged not to open this circuit until magnet Y has neared the end of its operation and a full and complete step is assured.

If no idle trunks are found, overflow springs 205 open to stop switch motion, overflow springs 201 close to return busy tone and contacts 301 close to cause the monitor lamp to glow brightly.

*Switch through.*—Assuming next that an idle truck is found, there is no ground on conductor S'; hence, switch through relay 210 is no longer shunted. It operates over a path which may be traced from master ground (+) through operated contacts 334 on release delay relay 330, through the winding of switch through relay 210, operated Y off-normal contacts 203, normal overflow contacts 205, normal Y interrupter contacts 206, the upper winding on hunt assist relay 250 and its break contacts 351, Z interrupter contacts 304 to (−) battery. The characteristics of this circuit are such that switch through relay 210 operates, but hunt assist relay 250 does not operate. The shunt path formerly extended from conductor S' over rest contacts 215 on switch through relay 210, operated contacts 231 on release delay relay 330, operated Y off-normal contacts 203 and the winding of switch through relay 210.

When switch through relay 210 operates, it opens its lowermost contacts 313 to open the circuit to release magnet Z thereby preventing an inadvertent release of the switch. The next set of contacts 312 close to cause monitor lamp MON to glow dimly due to the inclusion of resistor R3 as an indication that the switch through relay has operated. Contacts 211*a* and 215 open to prevent possible reoperation of either the hunt assist relay or the Y magnet. Contacts 219 open to disconnect the X conductor and prevent any possible operation of the digit count relay. The HS conductor is switched through at contacts 217 to the next succeeding circuit. This conductor is used to provide supervisory functions not material to this invention. Contacts 215 open to disconnect sleeve S' from the shunting circuit to the switchthrough relay 210. Contacts 216 close sleeve S' to sleeve S and connects ground (+) thereto from contacts 334. The tip and ring conductors are switched through at operated contacts 212 and 214. The calling bridge relay is disconnected at opened contacts 211 and 213.

The calling party is now connected with zero operator 110 and conversation follows during which time the operator learns the destination of the call and proceeds to complete the connection in any suitable manner, such as by a plug and jack or by electro-mechanical switching equipment. After completion of the call, the circuit is released in the manner described below in the section entitled "Release."

*Call from subscriber A to subscriber D*

The next call to be described will be local to a particular exchange wherein the first three or office selecting digits are not necessary and only the last four line or selecting digits are used. In this case, the selector is caused to drop-back three times after which it is unlocked so that any level may be used. A call of this type is one wherein subscriber A calls subscriber D by dialing the call number FI-4-XXXX. Since the letters F and I are the same as the digits 3 and 4 respectively, on the standard dial, it is seen that subscriber A must first direct selector 102 to the third level which is marked by N and V wiring and then to the fourth level twice which is marked by a Z wiring. Hence, it is to be expected that the N and V wiring will cause drop-back the first time that it is dialed. The Z wiring causes drop-back the first time that it is dialed and drop-back plus unlocking the second time that it is dialed.

Selector 102 is assumed to be the same as that shown in detail in Figs. 2–4. The switch is seized and propelled in its primary direction in the manner described above in the sections entitled "Seizure" and "Dialing."

*N and V wiring.*—It is assumed that the switch is driven three steps in a primary direction responsive to dialing the letter "F." This level is marked in the X bank by V wiring and in the XX bank by N wiring as shown in Fig. 1—first office. The ground (+) from the V wiring is extended through rest contacts 423 on digit add relay 420, rest contacts 243 on the X delay relay, operated contacts 221 on calling bridge relay 220, rest contacts 219 on switch through relay 210, normal contacts 263 and through the winding of digit count relay 260 to (−) battery. This relay operates and at its uppermost contacts 262, it prevents transmission of busy tone and applies ground (+) at contacts 261 to the upper winding of calling bridge relay 220. Digit count relay 260 locks at its holding contacts 264 over a circuit which may be traced through contacts 424, 412 and 426 and in parallel therewith through normal X interrupter springs 403, and switch through relay contacts 218 to master ground (+) applied at operated contacts 334 on release-delay relay 330. Contacts 366 on digit count relay 260 connects the N wiring to release magnet Z to cause the switch to drop-back to normal. The path for energizing magnet Z may be traced from (−) battery through the winding of magnet Z, X off-normal springs 306, rest contacts 313 on switch through relay 210, operated contacts 336 on release delay relay 330, operated contacts 366 on digit count relay 260 to the N wiring from which the circuit may be traced through the XX brush and conductor to released contacts 244 on X delay relay 240 and rest contacts 218 on switch through relay 210 to master ground (+) applied by release delay relay 330 at contacts 334.

Magnet Z operates and following drop-back the switch is in condition to receive the next digit pulse train which is the latter "I" that causes the switch to operate as described above in the section entitled "Dialing" to the fourth level which is marked by the Z wiring. Digit count relay 260 remains locked in its operated position.

*Dialing Z wiring first time.*—Responsive to the second digit pulse train of four open loop pulses, the switch is stepped to its fourth level marked by the Z wiring as shown in Fig. 1—first office. Since digit count relay 260 is locked operated, a circuit is completed to operate second digit count relay 410, the circuit being from (−) battery through Z interrupter contacts 304, rest contacts 414, the winding of relay 410, Y off-normal contacts 209, operated contacts 362, the Z wiring, the XX brush and conductor, rest contacts 244 and 218 to master ground (+) applied at operated contacts 334.

Second digit count relay 410 operates and closes contacts 418 to cause the switch to drop-back. The circuit is from (−) battery through the winding of release magnet Z, operated X off-normal contacts 306, rest contacts 313, operated contacts 336, 366, 418 and 364 the Z wiring, the XX brush and conductor to master ground (+) via contacts 244, 218 and 334. A circuit is prepared for digit add relay 420 at contacts 416. Relay 410 locks at contacts 415 and 413 to a holding path which includes contacts 415, 413, 426, 218 and 334.

The switch is now normal and digit count relays 260 and 410 are locked in an operated position. Since the third digit is not to be used, it is to be expected that the switch will drop-back a third time; however, this time the switch will unlock so that the fourth digit may be effective to cause the selector to hunt in its secondary direction regardless of the level dialed. Since the called subscriber's number is FI–4–XXXX, the third digit is the number 4 which propels the switch to the Z wired level a second time.

*Dialing of Z wiring a second time.*—In this case the switch receives four digit pulses and operates in the manner described above in the section entitled "Dialing." On the first step in the primary direction, X interrupter springs 403 operate causing digit count relay 260 to restore. It should be noted that this relay originally operated and locked at its contacts 264 to ground (+) applied through X interrupter springs 403 and in parallel therewith through rest contacts 424 on digit add relay 420, rest contacts 412 on second digit count relay 410, and rest contacts 426 on digit add relay 420 to master ground (+) extended through contacts 218 on the switch through relay and contacts 334 on release delay relay 330. On reoperation of the first drop-back, relay 260 held via contacts 424, 412 and 426 when X interrupter contacts 403 opened. However, on reoperation following the second drop-back, second digit count relay 410 is locked operated as explained above in the section entitled "Dialing Z wiring the first time." Therefore, digit count relay 260 releases when its locking path is opened by operation of X interrupter springs 403, contacts 412 being open at this time.

When the switch stops on the Z wired level a second time, a circuit is completed from master ground (+) applied through operated contacts 334 of release delay relay 330 and rest contacts 218 on the switch through relay, rest contacts 244 on X delay relay 240, the XX conductor and brush, the Z wiring, rest contacts 363 on digit count relay 260, and operated contacts 416 on second digit count relay 410 to (−) battery through the winding of relay 420 to operate it. It locks at its contacts 428 to master ground (+) via contacts 218 and 334.

Digit add relay 420 closes its contacts 427 to reoperate digit count relay 260 over the circuit which may be traced from (−) battery through the winding of digit count relay 260, operated contacts 427 on digit add relay 420, operated contacts 413 on second digit count relay 410, operated contacts 425 on digit add relay 420, X interrupter contacts 403, rest contacts 218 on the switch through relay 210 to master ground (+) applied through operated contacts 334 on release delay relay 330.

When digit count relay 260 operates, a circuit is completed for causing the switch to drop-back to normal, the circuit being traced from master ground (+) applied through operated contacts 334 of release delay relay 330, rest contacts 218 on switch through relay 210, rest contacts 244 on X delay relay 240, the XX conductor and brush, the Z wiring, operated contacts 364 on digit count relay 260, operated contacts 418 on second digit count relay 410, operated contacts 366 on digit count relay 260, operated contacts 336 on release delay relay 330, rest contacts 313 on the switch through relay, operated X off-normal contacts 306 and through the winding of release magnet Z to (−) battery.

*Unlock.*—Digit add relay 420 operated and locked at contact 428. It should be noted that this relay cannot release until switch through relay 210 opens contacts 218. When the switch is reoperated on the fourth digit, X interrupter springs 403 open to cause digit count relays 260 and 410 to release because relay 420 is holding all operate and alternative locking paths open at one or more of the contacts 423–427 inclusive. It makes absolutely no difference which digit is dialed next, the switch will move in its secondary direction and switch through if an idle trunk is found. If any level marked by a V wiring is dialed, there is no result because the X conductor is held open at contacts 423 on locked digit add relay 420. If the M wiring marks the level dialed, the switch cuts through regardless of any prior digits as explained above. If the Q wiring marks the level dialed, there is no effect because contacts 361 and 417*a* are open. The Z wiring is open at contacts 364 and 416 while the N wiring is open at contacts 366. Hence, it is seen that the last four digits are used to select subscriber D without restriction to any particular level.

*Secondary motion.*—Following the fourth set of digit pulses, the switch steps in its second direction in search of an idle trunk. The first step in the secondary direction is taken when hunt assist relay 250 operates over the folowing circuit: Master ground (+), contacts 334, 218, 428, 417, 342, 204, 205, 206, the upper winding of hunt assist relay 250, contacts 351 and 304 to (−) battery. From this point the switch operates as described above in the sections entitled "Busy test" and "Switch through" to seize the called line.

Conversation follows after which the switch is restored as described below in the section entitled "Release."

*Call from subscriber A to subscriber B*

This call is completed in the manner explained above in the section entitled "Call from subscriber A to subscriber D." The purpose of showing the two possible calls is merely to emphasize the fact that after the switch unlocks, any level may be selected whether there is or is not any wiring on the X or XX bank.

*Call from subscriber A to subscriber C*

The next call to be described will be one wherein the first two digits are not used, but the third is used. A call of this type is one which extends from subscriber A to subscriber C wherein the third digit is used to set local first selector 102, the fourth to set second selector 105 and the next three to set connector 106.

The circuits operate in the manner described above in the sections entitled "N and V wiring" and "Dialing Z wiring first time." The third digit is seven open loop pulses which direct the switch to the Q wiring as shown in Fig. 1—first office.

*Q wiring.*—To review briefly, the Q wiring is used after a digit which directed the switch to a level marked by the V wiring thereby operating digit count relay 260 which locked. On the next digit relay 410 operated and locked. On the third digit, the Q wiring is extended through operated contacts 417*a* of second digit count relay 410, to Y off-normal springs 204, overflow contacts 205, Y interrupter contacts 206, the upper winding of hunt assist relay 250, rest contacts 351 on hunt-assist relay 250 to (−) battery through Z interrupter springs 304. This causes the hunt assist relay to operate. A circuit is now closed to the Y magnet for causing the switch to take its first step in the secondary direction. From this point, the switch operates to hunt for an idle trunk in the manner described above in the sections entitled "Busy test" and "Switch through."

It should be noted that the switch is not unlocked on the Q wiring as it was on the call to subscriber D when the Z wiring was dialed the second time. In that case digit add relay 420 was operated via contacts 363 and 416 the second time that the Z wiring was dialed. This relay disabled digit count relays 260 and 410 to prevent further drop-back. In the second case, digit add relay 420 cannot operate when the Q wiring marks the selected level because such operation would have to be via contacts 342 and 417—the latter being open at this time. Hence, it is seen that any level may be reused in the first case even after it has caused the switch to drop-back while in the second case only the Q or M wiring could be used.

The last four digit pulse trains set selector 105 and connector 106 following which there may be conversation. The circuits restore as explained below in the section entitled "Release."

*Call from subscriber F to subscriber I*

The chief difference between calls in the first office and calls in the second office is that, in the first office the called subscriber lines are identified by a directory number wherein the second and third office selecting digits may be the same number. Whereas, in the second office the first and third office selecting digits may be the same number. For example, when subscriber F calls subscriber I, the letters HE–4 are dialed. The letter H is the same as the digit 4; therefore, it is seen that the first and third digits are the same.

Since only four digits are required to complete a call from subscriber F to subscriber I, the first three digits should be absorbed. The fourth digit sets local first selector 122 while the fifth, sixth and seventh digits set connector 127. Local selector 122 is seized and operated in the manner described above in the sections entitled "Seizure" and "Dialing."

*Z and V wiring.*—Since the letter H is represented by four digit pulses, local first selector 122 is directed to a level marked by the Z and V wiring. A circuit is completed from ground (+) over the V wiring, the X brush and conductor, rest contacts 423 and 243, operated contacts 221, rest contacts 219, rest contacts 263 and through the winding of digit count relay 260 to (—) battery. It operates and closes its contacts 261 while opening its contacts 262 thereby preventing busy tone from being transmitted to the calling subscriber line. Digit counting relay 260 operates and locks at contacts 264 through X interrupter contacts 403 and in parallel therewith, contacts 424, 412 and 426, then over contacts 218 and 334 to master ground (+). Contacts 362 close to operate second digit count relay 410 over a circuit which may be traced from master ground (+) on contact 334, rest contacts 218 on switch through relay 210, rest contacts 244 on X delay relay 240, the XX conductor and brush, the Z wiring, contacts 362, Y off-normal contacts 209, through the winding of second digit count relay 410, rest contacts 414 and Z interrupter contacts 304 to (—) battery. Second digit count relay 410 operates and closes its contacts 418 thus causing the switch to drop-back to normal. This function is over the circuit including master ground (+) applied through the Z wiring (previously traced) and relay contacts 364, 418, 366, 336, 313, X off-normal contacts 306 and through the winding of release magnet Z to (—) battery. Release magnet Z operates and causes the switch to drop-back to normal. Digit count relay 260 is locked at contacts 264 and second digit count relay 410 is locked at contacts 415, thus recording the fact that one digit pulse train has been absorbed.

*N wiring.*—Subscriber F dials the second numerical designation of called subscriber I which is the letter E or 3 open loop pulses. Since second digit count relay 410 is operated, one of the holding circuits for digit count relay 260 is open at contacts 412. This holding circuit previously extended through contacts 264, 424, 412 and 426 to master ground (+). Digit count relay 260 remains operated until the switch takes its first step in the primary direction responsive to the second digit pulse train, at which time, X interrupter contacts 403 open and digit count relay 260 releases. Second digit count relay 410 continues to be held at contacts 415 and 413.

When the level marked by the N wiring is reached, a circuit is completed for causing the switch to drop-back; this circuit may be traced from master ground (+) applied over operated contacts 334 on release delay relay 330, rest contacts 218 on switch through relay 210, rest contacts 244 on X delay relay 240, the XX conductor and brush, the N wiring, operated contacts 418 on second digit count relay 410, released contacts 365 on digit count relay 260, operated contacts 336 on release delay relay 330, rest contacts 313 on switch through relay 210, operated X off-normal contact 306 to release magnet Z and (—) battery. This causes magnet Z to operate and the switch drops-back to normal. Digit add relay 420 does not operate since contacts 364 are open because digit count relay 260 is now released.

If it is necessary to absorb more digits than those described, the level marked by the N wiring may be dialed any number of times and the switch continues to drop-back.

*Dialing Z wiring second time.*—The third digit to be dialed by calling subscriber F consists of four open loop pulses which drive local first selector 122 to the level marked by the Z wiring as shown in Fig. 1—second office. At this time, digit count relay 260 is released and second digit count relay 410 is locked in an operated position. A circuit may be traced through the Z wiring for operating digit add relay 420. This circuit extends from (—) battery through the winding of relay 420, operated contacts 416, release contact 363 and the Z wiring to the XX brush and conductor, rest contacts 244 on X delay relay 240, rest contacts 218 on switchthrough relay 210 to master ground (+) on operated contacts 334 of release delay relay 330.

Digit count relay 260 reoperates responsive to operation of digit add relay 420. The circuit for this may be traced from (—) battery through the winding of relay 260 and over contacts 427, 413, 425, 403, 218 and 334 to master ground (+). Contacts 428 are "X" or preliminary contacts which are arranged to operate before relay 260 has had an opportunity to operate from the marking on the V-wiring. Once relay 420 has operated contacts 423 open so that relay 260 may not operate thereafter from the V-wiring, but must depend upon operation of contacts 427 and 425 as explained above. This is necessary because relay 420 must operate before relay 260 has had time to open 363. An alternative to this preliminary contact feature is to provide an additional break contact on relay 410 which is arranged to open the X conductor to prevent a race between relays 420 and 260.

A drop-back circuit may be traced from ground on Z-wiring through operated contacts 364 on digit count relay 260, operated contacts 418 on second digit count relay 410, operated contacts 366 on digit count relay 260, operated contacts 336 on release delay relay 330, rest contacts 313 on switchthrough relay 210, operated X off-normal contacts 306 and through the winding of release magnet Z to (—) battery. The switch drops-back; however, digit add relay 420 remains locked over the circuit which may be traced from locking contacts 428 over rest contacts 218 to master ground (+) on operated contacts 334.

The switch may be directed to any desired level on the next digit pulse train. Digit count relays 260 and 410 release after operation of digit add relay 420 since their only holding path then extends through X-interrupter contacts 403 which open on the first step in the primary direction on receipt of the next digit. Following this digit pulse train, local selector 122 operates to switchthrough in the manner described above in the section entitled "Switch through."

*Call from subscriber F to subscriber G*

Subscriber F calls subscriber G by dialing first a level marked by the Z and V wiring, second a level marked by the N wiring, and third a level marked by the Z and V wiring. Each time the switch drops-back. On the first occasion, digit count relay 260 operates from the V wiring and locks following which second digit count relay 410 operates over contacts 362. The second time that the switch drops-back, none of the digit count or digit add relays are operated. The third time that the switch drops-back, responsive to dialing a Z marked level, digit add relay 420 operates over a circuit which may be traced from the Z wiring through rest contacts 363 on digit count relay 260, operated contacts 416 on second digit count relay 410 and through the winding of digit add relay 420 to (—) battery. Relay 420 operates and locks at its contacts 428. The switch is now unlocked so that any level may be seized. These switch functions are described above in the section entitled "Call from subscriber F to subscriber I."

This call is described merely to emphasize the fact that once the switch is unlocked there is no further need for level marking and the switch may cut through without any marking at all.

*Call from subscriber F to subscriber H*

The calling subscriber completes the loop and selector 122 is seized as described above in the section entitled "Seizure" following which the first digit operates the selector in the manner described above in the section entitled "Dialing." On the first digit, the switch is directed to a level marked by the Z and V wiring from which it drops-back and digit count relays 260 and 410 are locked in an operated position as an indication that one digit has been absorbed. On the second digit pulse train, the switch is driven in its primary motion to the level marked by the N wiring and the switch again restores all in the manner described in the call from subscriber A to subscriber I. On the third digit, the switch is directed to the seventh level marked by the Q wiring. A circuit is completed from ground (+) on contacts 334 over contacts 218, 244, the XX conductor and brush, Q wiring, operated contacts **417*a* on locked operated second digit count relay 410, resting Y off-normal contacts 204, resting overflow contacts 205, Y interrupter contacts 206, the upper winding of hunt assist relay 250, rest contacts 351 on hunt assist relay 250 and Z interrupter contacts 304 to (—) battery. From this point the switch operates to seize selector 125** in the manner described above in the sections entitled "Busy test" and "Switch through."

It should be noted that the switch has not unlocked so that if any level other than the Q marked level had been dialed there would have been a different result.

*Return of busy tone on dialing mistakes*

Sometimes, it may happen that the calling subscriber inadvertently dials the wrong number during the digit absorbing process. For example, suppose that the subscriber inadvertently causes the switch to be driven in its first operation to a level marked by the N wiring only. There is no circuit for operating digit count relay 260 since there is no V wiring in this case. Furthermore, there is no way for the switch to drop-back since the N wiring is open at contacts 418 and 366; hence the switch just stands and there is no further operation. A similar situation would be where the switch is directed on its first operation to a level marked only by the Q or Z wiring.

In these and similar cases, there is no way for the switch to continue to operate; therefore, the calling subscriber would not know what to do unless some special provision is made. There is such a provision in that X off-normal contacts 401 close when the switch first moves off-normal. Responsive thereto, a circuit is completed for connecting busy tone through contacts 401, 422, 411, 262, 202, the upper winding of calling bridge relay 220, rest contacts 211 and tip conductor T to the calling subscriber. While the switch is moving under the influence of the subscriber's dial, his receiver is shunted by dial springs so that he can hear neither dial pulses nor busy tone. Immediately after the dial comes to rest and if a correct first digit is dialed, either digit count relay 260 or digit add relay 420 may operate to disconnect busy tone at contacts 422 or 262; while, if the circuit operates to switchthrough, busy tone is disconnected at contacts 211 of switchthrough relay 210. On the other hand, if an incorrect first digit is dialed, the calling subscriber hears busy tone and hangs up.

*Release*

Following completion of the call, succeeding equipment removes a ground marking from conductor S'. Switchthrough relay 210 has been holding over a circuit from this ground through operated contacts 216, the winding of relay 210, operated Y off-normal contacts 203, recting overflow contacts 205, Y interrupter contacts 206, the upper winding of hunt assist relay 250, contacts 351 and contacts 304 to (—) battery. Switchthrough relay 210 now releases to open tip T and ring R at contacts 212 and 214. Calling bridge relay 220 is reconnected to the line at contacts 211 and 213. The circuit is now ready for the next call.

The switch is guarded against premature seizure during release by the busy ground returned over contacts 303 and 335 to sleeve conductor S.

*Permanent timing*

On occasions it may be that the selector is seized and no switch directing digit pulses are received within an allotted time; therefore, it is necessary for the switch to be restored forcibly to normal. Otherwise, it would be possible for the switch to be held permanently by a signal such as a short on the subscriber's line or by the receiver being inadvertently removed or left off its switchhook. For this purpose, permanent timing relay 430 is connected to a common interrupter circuit when release delay relay 330 first operates. This circuit may be traced from (—) battery through the winding of permanent timing relay 430, operated contacts 332 on release delay relay 330, rest contacts 433 on permanent time relay 430 to timed pulse conductor TP1. Ground pulses appear on this conductor at timed intervals so that after a predetermined period, permanent time relay 430 operates and locks at its contacts 434. Holding ground broken by open pulses is applied by the interrupter to hold conductor H2. This ground is applied to hold release delay relay 330 operated in lieu of the solid ground previously applied through rest contacts 432 on permanent time relay 430. At the expiration of a second measured time interval, the holding ground is removed from conductor H2 and release delay relay 330 restores thereby removing master ground (+) at its contacts 334. This in turn releases any of the relays which may be operated.

If the switch has moved off-normal and has not completed the switchthrough operation during the measured time interval, it returns to normal when release delay relay 330 closes its contacts 337 to connect the release alarm conductor to release magnet Z by way of resting contacts 337, 313 and X off-normal contacts 306.

*Miscellaneous*

Various other elements have been shown but not explained because they are standard features and have nothing to do with the invention. For example, one feature is the spark protection circuits labeled SP. They prevent sparking at contacts in the various pulsing paths. Another feature is the monitor jacks which provide a means by which maintenance men may check operation of the circuit. The busy key provides a means for preventing a preceding circuit from seizing this particular selector if maintenance is required. The lower winding of hunt assist relay 250 is non-inductive and is short circuited through its own normally closed contact 351 to reduce the resistance in series with its upper, low-resistance, inductive winding to make that relay very fast to operate but having means to insert the resistance of the lower winding once the relay is operated to reduce the relatively large current required for quick operation.

The appended claims are designed to cover not only the specific embodiment shown in the drawing but also such modifications as may be within the scope of my invention.

What I claim is:

1. In a telephone system, a calling subscriber line, a called subscriber line, means for seizing said called subscriber line under the influence of a seven digit number transmitted from the calling station, said last named means including a local selector switch comprising one set of brushes which carry the conversation conductors, an auxiliary set of brushes, means for moving said first set of brushes in a primary and a secondary direction and for moving said auxiliary brushes over an associated bank of contacts simultaneously with said primary motion, means for selectively marking various terminals in said associated bank of contacts, means for causing said switch to return to normal when driven in its primary direction to a first predetermined level having one of said markings, means for causing said switch to return to normal a second time when driven in its primary direction to a second level having another of said markings and means for causing said switch to return to normal a third time when driven again in its primary direction to said second level.

2. The telephone system of claim 1 and means responsive to said third switch operation for unlocking said switch whereby it may thereafter seize any idle terminal in any of the levels to which it may be directed in its primary motion.

3. In a telephone system, a calling subscriber line, a called subscriber line, means for seizing said called subscriber line under the influence of a seven digit number transmitted from the calling station, said last named means including a local selector switch comprising one set of brushes which carry the conversation conductors, means for moving said one set of brushes in a primary and a secondary direction, an auxiliary set of brushes, means for moving said auxiliary brushes over an associated bank of contacts simultaneously with said motion in said primary direction, means for selectively marking various terminals on said associated bank of contacts, means for causing said switch to return to normal when driven in its primary direction to a first predetermined level having one of said markings, means for thereafter causing said switch to return to normal a second time when driven in its primary direction to a second predetermined level, and means for thereafter causing said switch to return to normal a third time when driven in its primary direction to said first level.

4. In the telephone system of claim 3 and means responsive to said third switch operation for unlocking said switch whereby it thereafter may seize any idle terminal in any of the levels to which it may be directed in its primary motion.

5. A local selector switch for use in a telephone system comprising means for driving said switch in a primary direction, means for driving said switch in a secondary direction, means for releasing said switch from either or both of said directions, means responsive to operating said switch to a predetermined level for operating said release means, means responsive to said first operation for registering said first release, means responsive to operating said switch to a second level when said first release is registered for operating said release means a second time, means responsive to said second operation for registering said second release, means responsive to operating said switch again to said second level for operating said release means a third time, means responsive to said third release when said first two releases are registered for unlocking said switch and means responsive to operating said switch a fourth time in said primary direction for causing said switch to operate in said secondary direction.

6. The selector of claim 5 and an auxiliary set of terminals, one for each effective primary step of said switch, said releases being registered in a chain of counting relays comprising a first digit count relay, means for operating said first relay from the auxiliary terminal corresponding to the extent of said first operation of said switch, make and break contacts on said first relay, a second digit count relay, means for operating said second relay via said make contacts on said first relay and the auxiliary terminal corresponding to the extent of said second operation of said switch, means responsive jointly to operation of said second relay and said third operation of said switch for releasing said first relay, make contacts on said second relay, a digit add relay, means for operating said digit add relay via said make contacts on said second relay, said break contacts on said first relay and the auxiliary terminal corresponding to the extent of said third operation of said switch, and means responsive to operation of said digit add relay for unlocking said switch.

7. In a local first selector for use in a telephone system, a plurality of terminal contacts arranged in a bank wherein said contacts are grouped in levels, means for causing said selector to have access to said terminals responsive to a primary and a secondary motion, an auxiliary bank of contacts searched over simultaneously with said primary motion, means for selectively marking said auxiliary bank in accordance with desired switch operation, a first digit count relay, means responsive to primary switch motion for operating said first relay from one of said auxiliary contact markings, a second digit count relay, means jointly responsive to operation of said first digit count relay and said one auxiliary contact marking for operating said second digit count relay, means also responsive to said one auxiliary contact marking for causing said switch to drop-back, means including another of said markings for thereafter causing said switch to drop-back each time that said other marking is found responsive to said primary motion while said second relay is operated, means responsive to operation of said second digit count relay and reoperation of said switch after drop-back for releasing said first digit count relay, a digit add relay, means responsive jointly to the release of said first digit count relay to the operation of said second digit count relay and to said first auxiliary marking for operating said digit add relay and means responsive to operation of said digit add relay for unlocking said switch.

8. In a telephone system, a called subscriber line, a calling subscriber line, means for seizing said called subscriber line under the influence of a seven digit number transmitted from the calling station, said last named means including a local selector switch comprising one set of brushes which carry the conversation conductors, an auxiliary set of brushes, means for moving said first set of brushes in a primary and a secondary direction and for moving said auxiliary brushes over an associated bank of contacts simultaneously with said primary motion, means for selectively marking various terminals in said associated bank of contacts, one of said marking means comprising means for causing said switch to operate in its secondary direction, a second of said marking means comprising means for operating a first relay to register a first switch operation, a third of said marking means comprising means for causing said switch to drop-back to normal if encountered before said switch unlocks, a fourth one of said marking means comprising means for causing said switch to drop-back to normal the first time that it is encountered in a particular call and to cause said switch to drop-back and unlock the second time that it is encountered in said particular call, and a fifth one of said marking means comprising means for causing said switch to operate in its secondary direction if it is encountered in any given call after operation of said switch to said second marking means or said fourth marking means.

9. The telephone system of claim 8 and two digit marking relays, means responsive to operation of said switch to said fourth marking means for the first time during said particular call for operating said second relay if said second marking means has been encountered previously in said particular call, means for operating said third relay the second time that said fourth marking is encountered in said particular call after said second marking has been encountered in said particular call.

10. The telephone system of claim 8 and means for returning a busy tone to said calling subscriber line if said marking means are encountered in an improper order during any given call.

11. The telephone system of claim 10 and means for measuring the expiration of a predetermined period after seizure of said selector and means for releasing said selector after expiration of said time period.

12. The telephone system of claim 9 and means for returning a busy tone to said calling subscriber line if said marking means are encountered in an improper order during any given call and means responsive to the operation of any of said relays for disabling said last named means.

References Cited in the file of this patent

UNITED STATES PATENTS

| | | |
|---|---|---|
| 1,581,244 | Suekoff | Apr. 20, 1926 |
| 1,747,478 | Lomax | Feb. 18, 1930 |
| 2,642,498 | Riddell et al. | June 16, 1953 |
| 2,658,949 | Pharis | Nov. 10, 1953 |
| 2,691,066 | Fisher | Oct. 5, 1954 |